US008103395B2

(12) United States Patent
Bissontz

(10) Patent No.: US 8,103,395 B2
(45) Date of Patent: Jan. 24, 2012

(54) HYBRID ELECTRIC VEHICLE TRACTION MOTOR DRIVEN POWER TAKE-OFF CONTROL SYSTEM

(75) Inventor: Jay E. Bissontz, Fort Wayne, IN (US)

(73) Assignee: International Truck Intellectual Property Company, LLC, Warrenville, IL (US)

(*) Notice: Subject to any disclaimer, the term of this patent is extended or adjusted under 35 U.S.C. 154(b) by 702 days.

(21) Appl. No.: 12/239,885

(22) Filed: Sep. 29, 2008

(65) Prior Publication Data
US 2010/0078234 A1      Apr. 1, 2010

(51) Int. Cl.
*B60L 11/00*      (2006.01)
(52) U.S. Cl. .................... 701/22; 180/65.8; 180/164
(58) Field of Classification Search ............. 701/22–24, 701/29–66, 99–115; 180/11–13, 53, 65, 180/116–130, 164–165, 301–310; 56/10; 477/3, 7
See application file for complete search history.

(56) References Cited

U.S. PATENT DOCUMENTS

| | | | | |
|---|---|---|---|---|
| 3,792,791 A | * | 2/1974 | Fleming et al. | 414/699 |
| 3,932,993 A | * | 1/1976 | Riedhammer | 60/431 |
| 6,073,428 A | * | 6/2000 | Diekhans | 56/10.2 R |
| 7,281,595 B2 | * | 10/2007 | Bissontz | 180/65.28 |
| 7,641,018 B2 | * | 1/2010 | Bissontz | 180/306 |
| 2004/0148917 A1 | * | 8/2004 | Eastwood | 56/6 |
| 2008/0060857 A1 | | 3/2008 | Knestrick et al. | |
| 2009/0236156 A1 | * | 9/2009 | Promersberger et al. | 180/53.4 |

FOREIGN PATENT DOCUMENTS

| | | |
|---|---|---|
| DE | 4204384 A1 | 8/1993 |
| EA | 1291467 A1 | 3/2003 |
| WO | WO2008060857 A1 | 4/2008 |

* cited by examiner

*Primary Examiner* — Mary Cheung
(74) *Attorney, Agent, or Firm* — Jeffrey P. Calfa; Mark C. Bach; Gerald W. Askew

(57) ABSTRACT

A hybrid electric work vehicle having an electric traction motor driven power take off used in conjunction with a control system that monitors the hydraulic system for pressure deltas and trend vectors, and that has learning capabilities, is provided for use with a vehicle for operation on the ground. The system is usable for both open center and closed center hydraulic systems. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

28 Claims, 14 Drawing Sheets

HYBRID ELECTRIC POWERTRAIN
HAVING AN ePTO AND HYDRAULIC PUMP

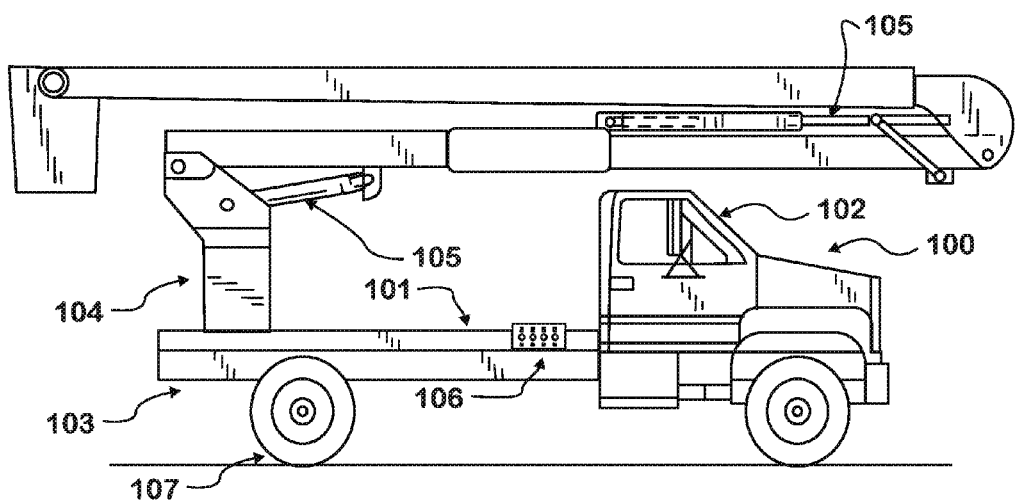
FIG. 1-
HYBRID ELECTRIC UTILITY
VEHICLE HAVING HYDRAULIC EQUIPMENT

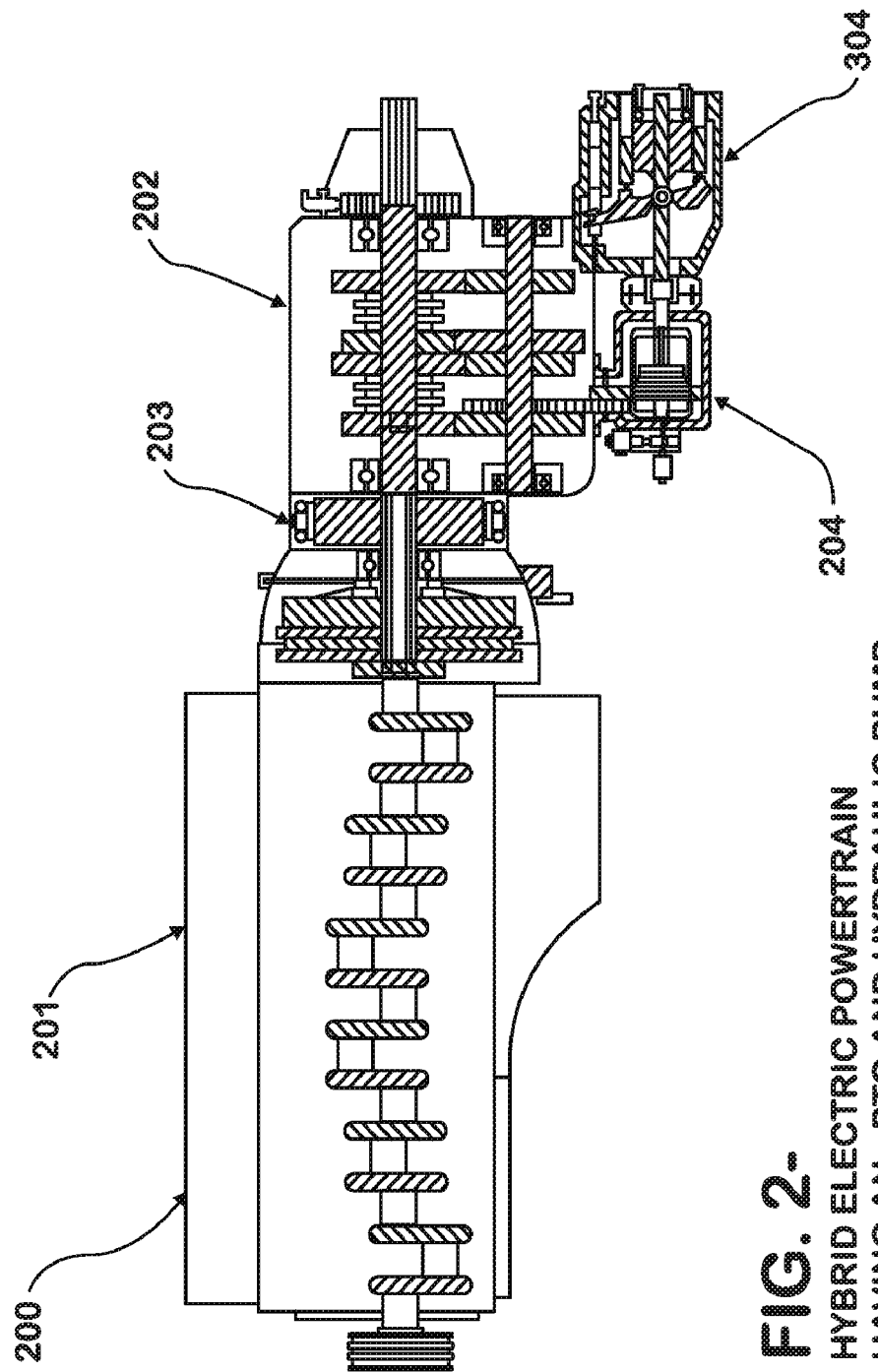
FIG. 2.-
HYBRID ELECTRIC POWERTRAIN
HAVING AN ePTO AND HYDRAULIC PUMP

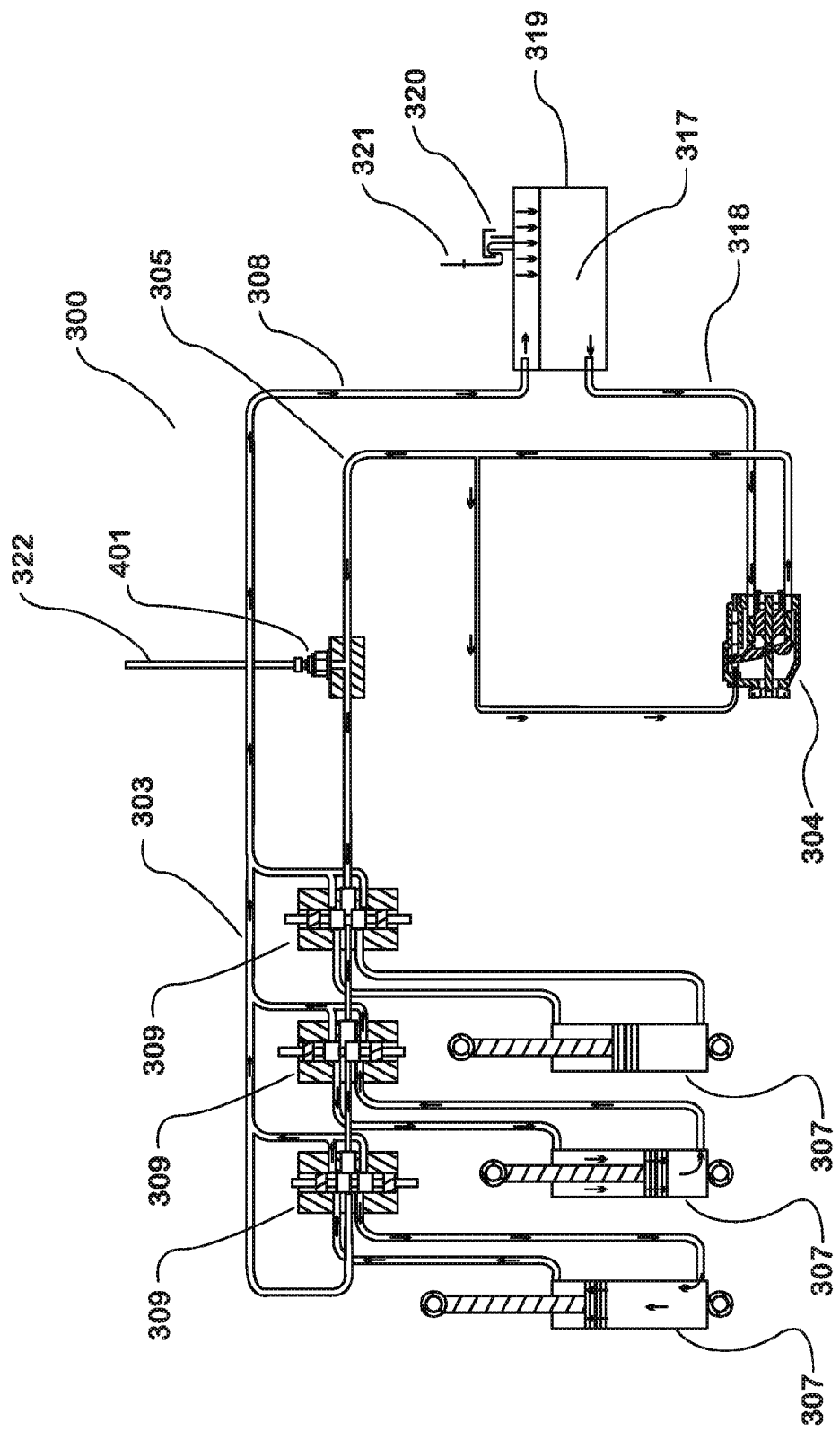
FIG. 3 - OPEN CENTER TYPE HYDRAULIC SYSTEM WITH HYBRID WORK DEMAND HYDRAULIC PRESSURE FILTER

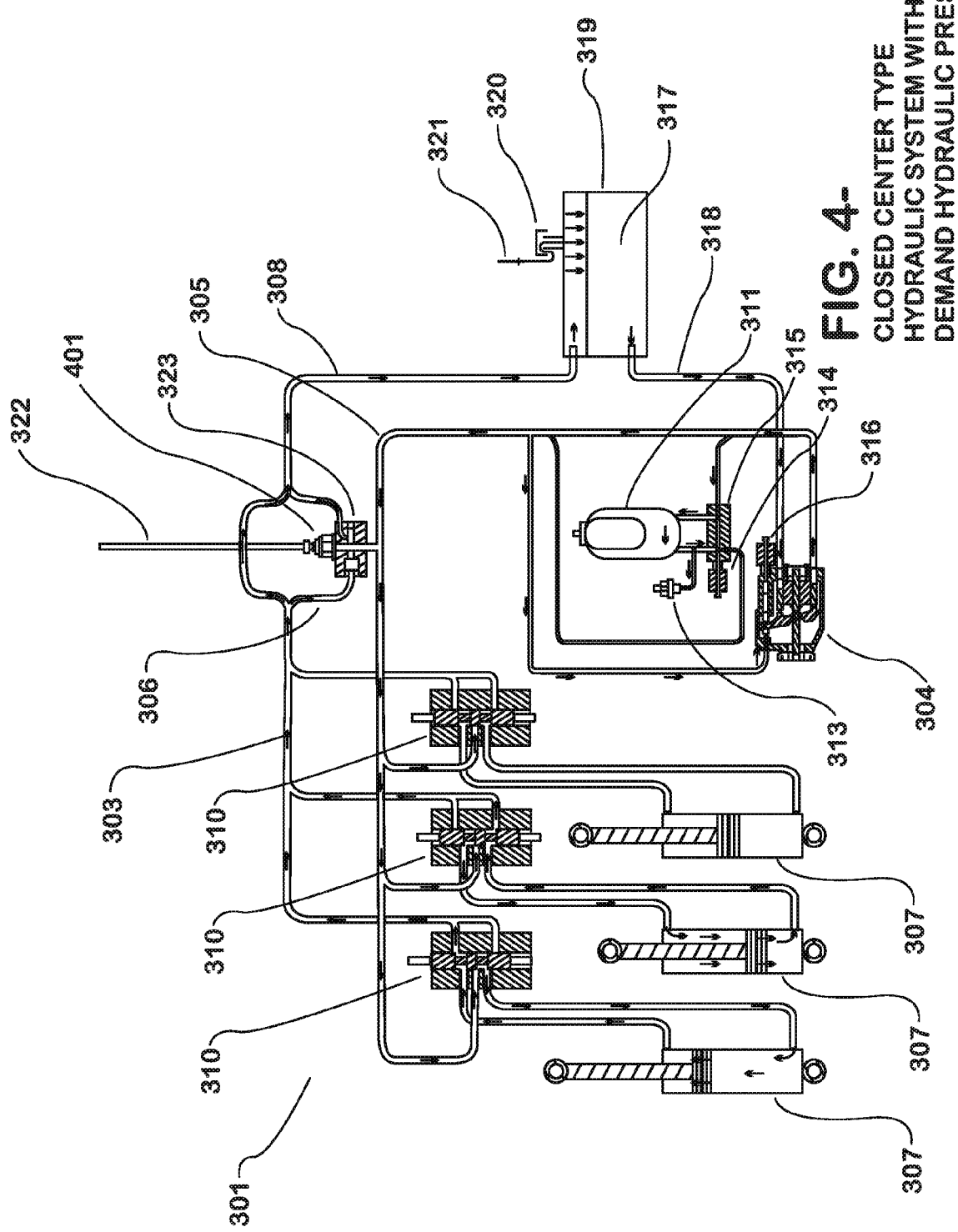
FIG. 4.- CLOSED CENTER TYPE HYDRAULIC SYSTEM WITH HYBRID WORK DEMAND HYDRAULIC PRESSURE FILTER

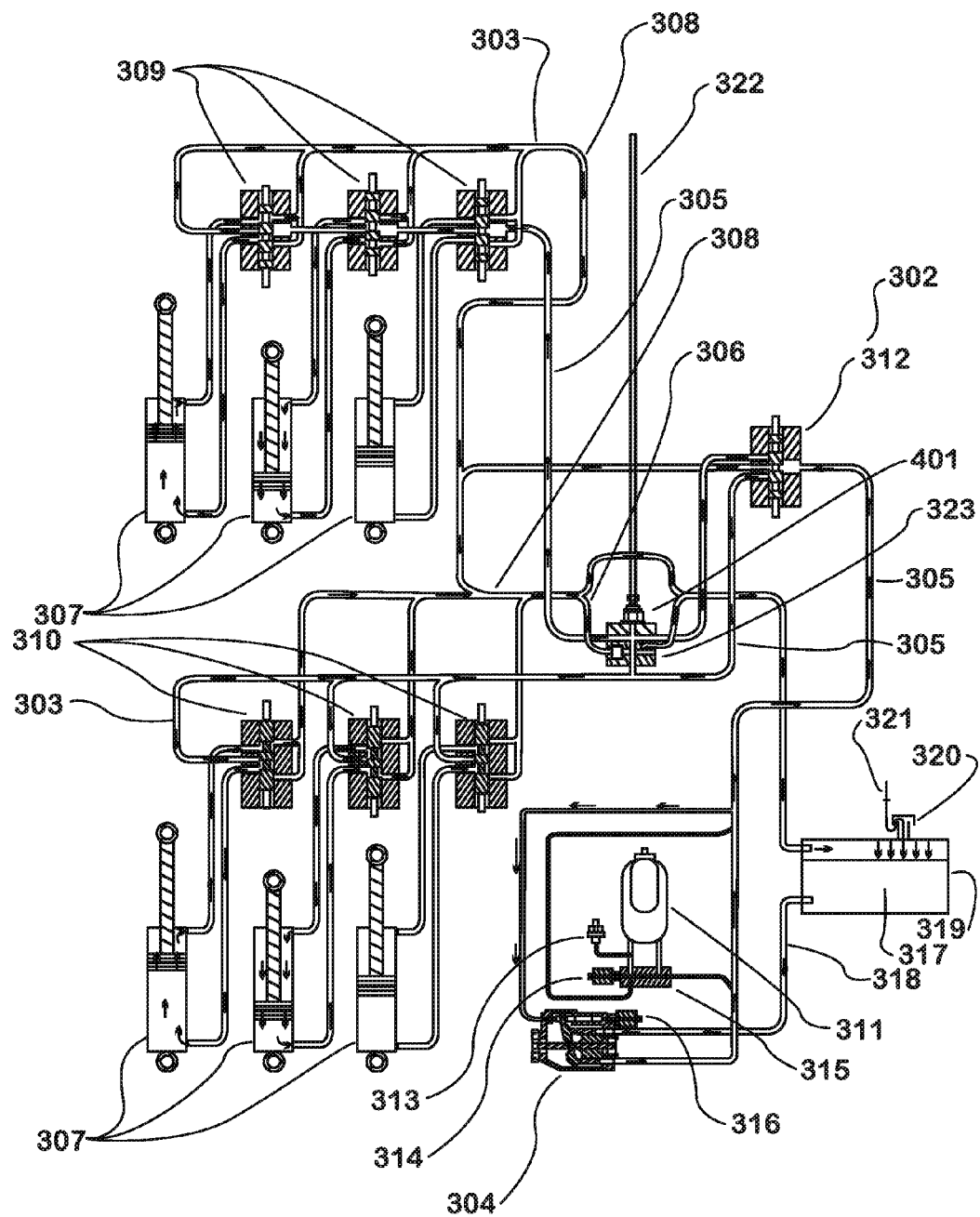
FIG. 5-
COMBINED OPEN AND CLOSED
CENTER TYPE HYDRAULIC SYSTEM
WITH HYBRID WORK DEMAND
HYDRAULIC PRESSURE FILTER

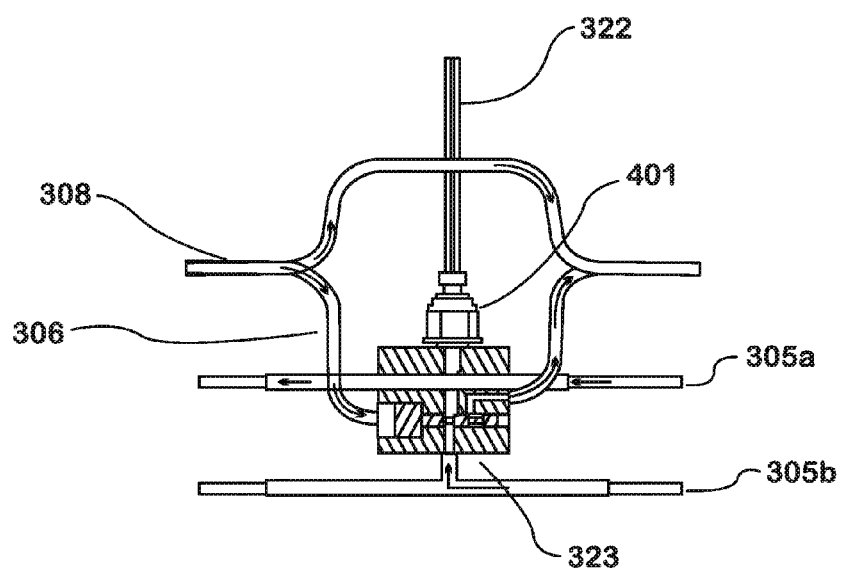
FIG. 6-
DETAIL OF ANALOG HYDRAULIC
PRESSURE TRANSDUCER AS IMPLEMENTED
IN A COMBINED OPEN AND CLOSED
CENTER TYPE HYDRAULIC SYSTEM

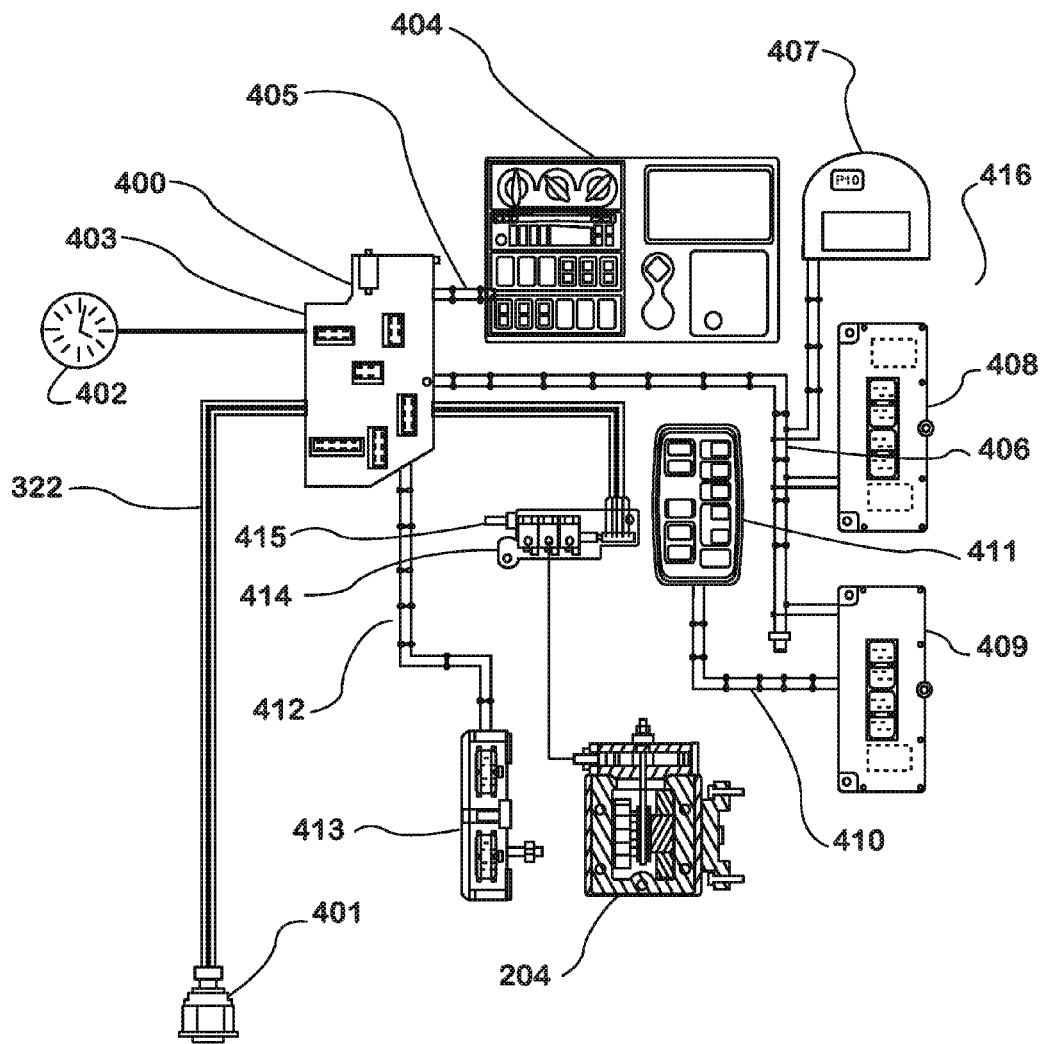
FIG. 7-
ANALOG HYDRAULIC PRESSURE TRANSDUCER,
ePTO CONTROL SYSTEM RESIDING WITHIN AN
ELECTRONIC SYSTEM CONTROLLER,
AND ASSOCIATED VEHICLE NETWORK

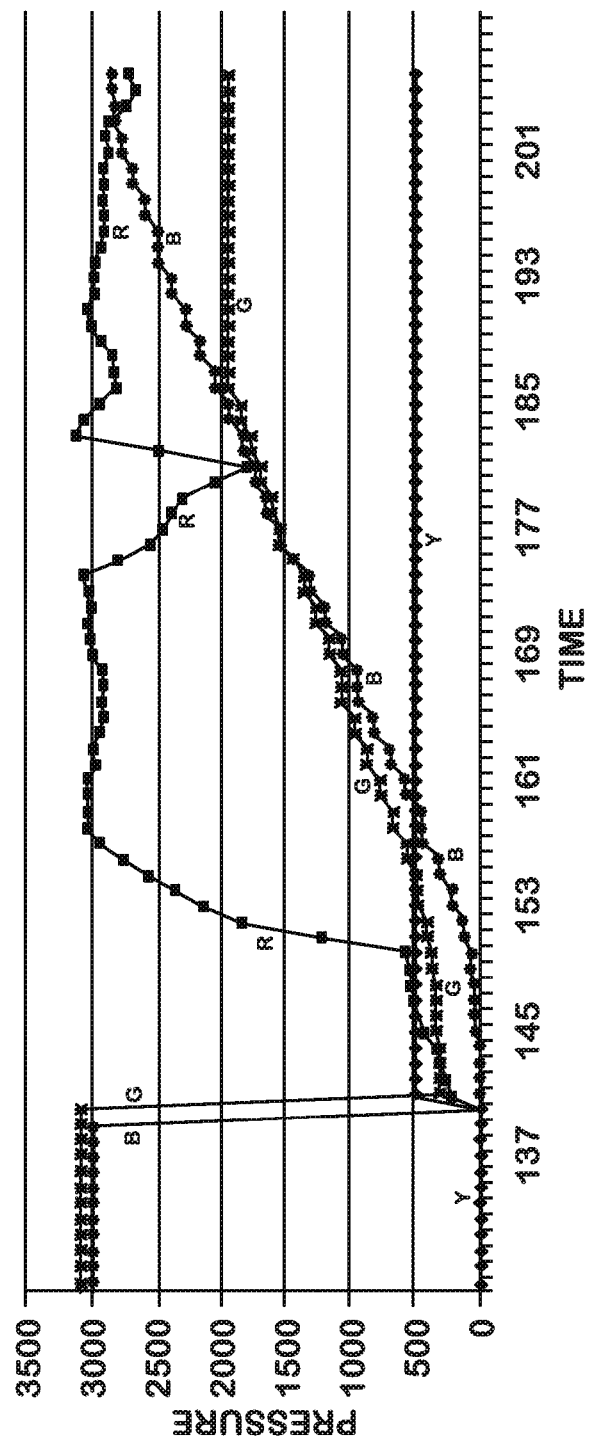
FIG. 8-
GRAPHICAL REPRESENTATION OF
ePTO CONTROL SYSTEM
UNDERGOING INITIALIZATION

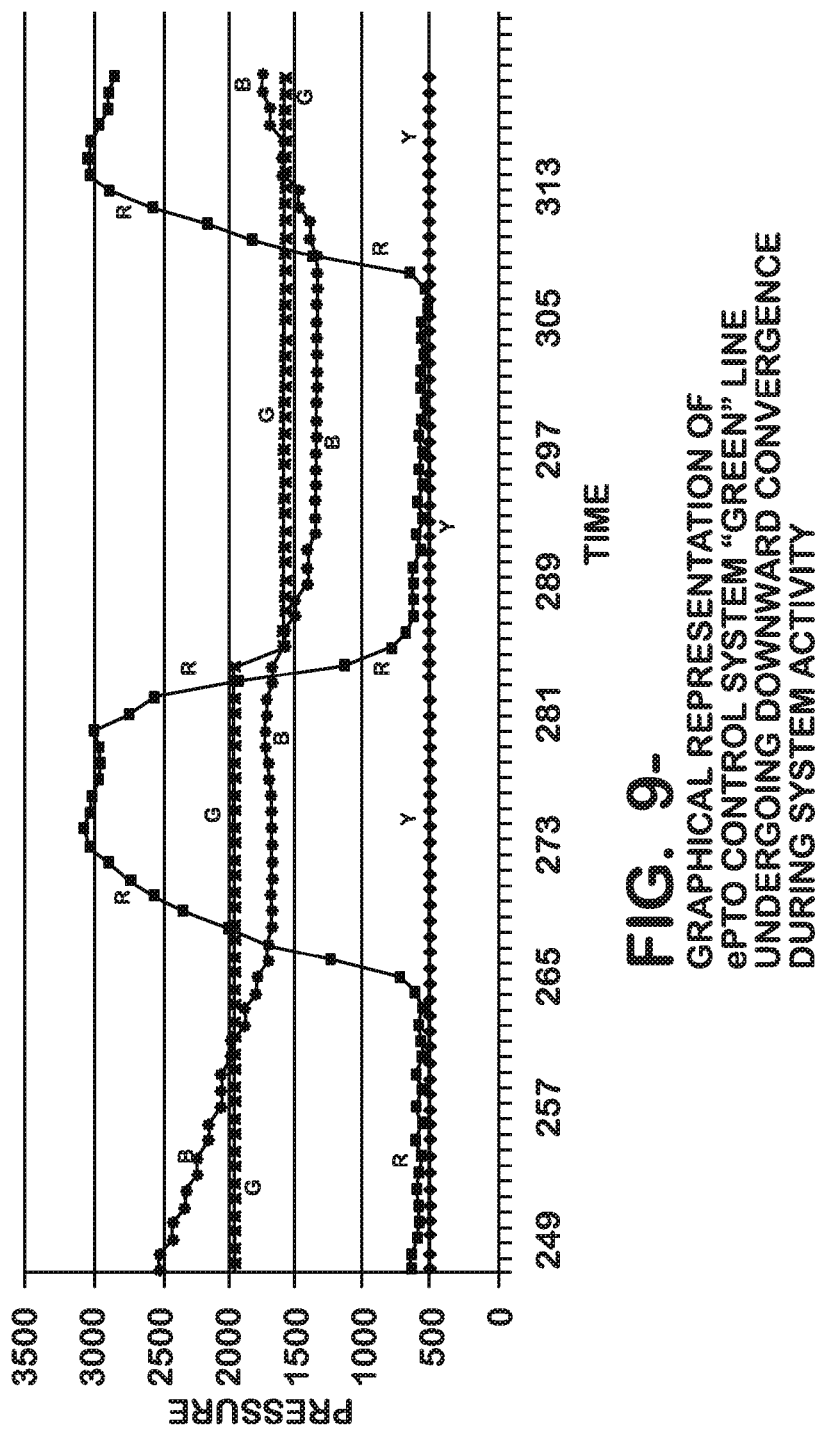
FIG. 9.-
GRAPHICAL REPRESENTATION OF
ePTO CONTROL SYSTEM "GREEN" LINE
UNDERGOING DOWNWARD CONVERGENCE
DURING SYSTEM ACTIVITY

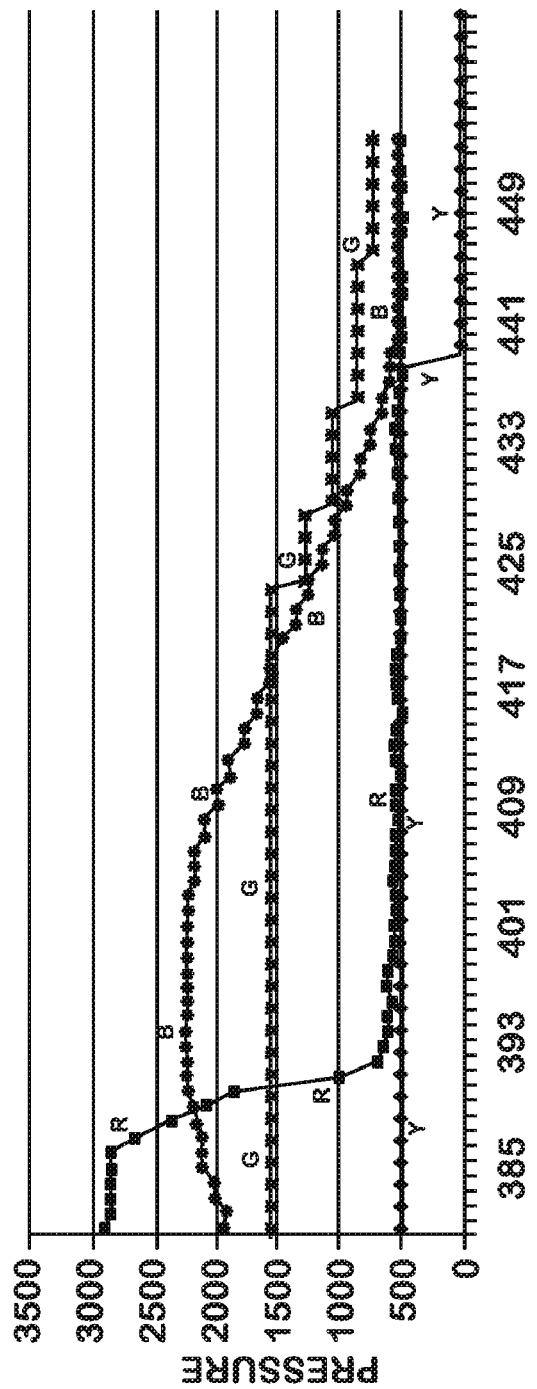
FIG. 10-
GRAPHICAL REPRESENTATION OF
ePTO CONTROL SYSTEM "GREEN" LINE
UNDERGOING DOWNWARD CONVERGENCE
DURING PERIOD OF SYSTEM INACTIVITY

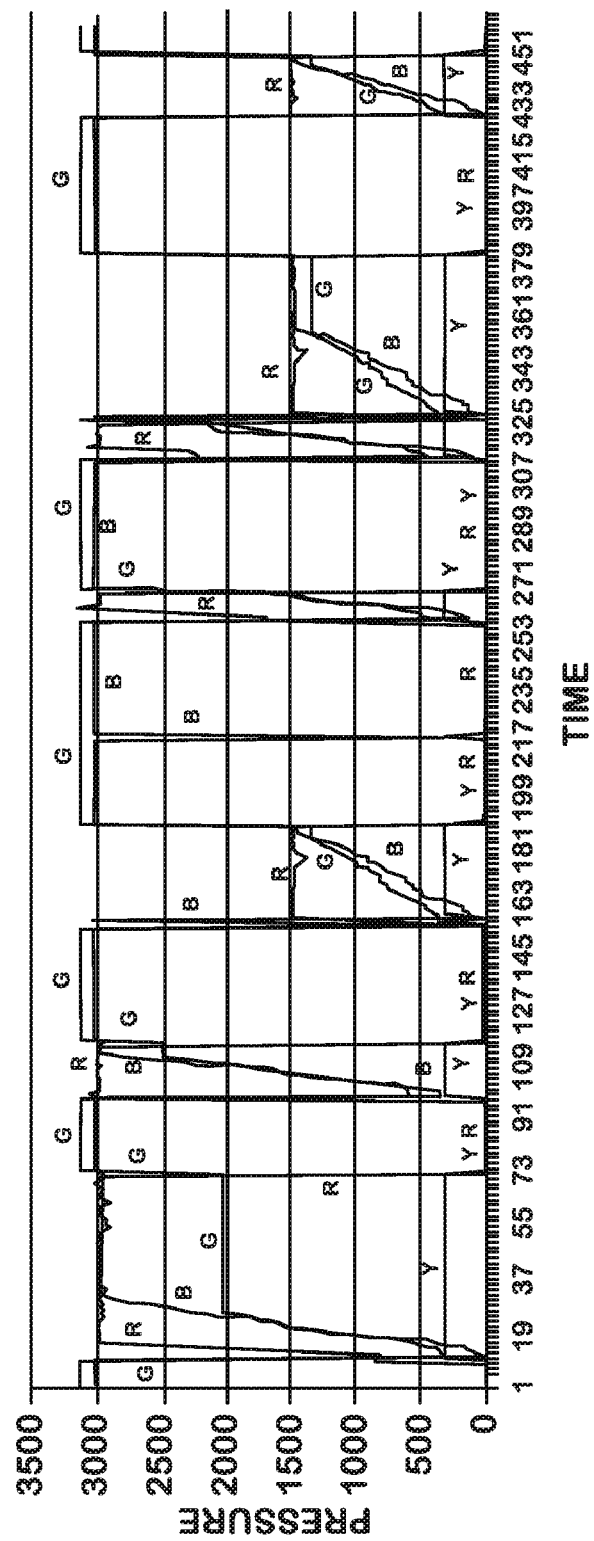
FIG. 11.-
GRAPHICAL REPRESENTATION OF ePTO CONTROL SYSTEM OPERATING IN CONJUNCTION WITH A CLOSED CENTER TYPE HYDRAULIC SYSTEM

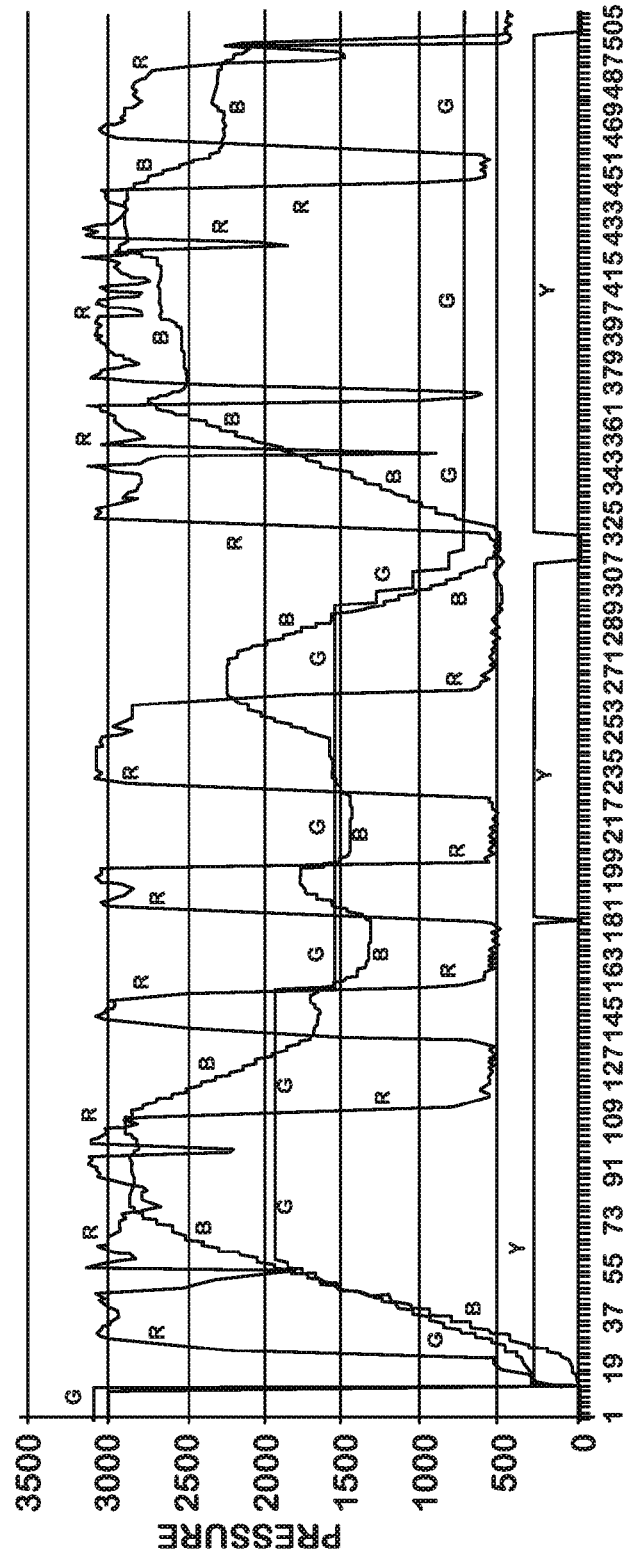
FIG. 12 -
GRAPHICAL REPRESENTATION OF ePTO CONTROL SYSTEM OPERATING IN CONJUNCTION WITH A OPEN CENTER TYPE HYDRAULIC SYSTEM

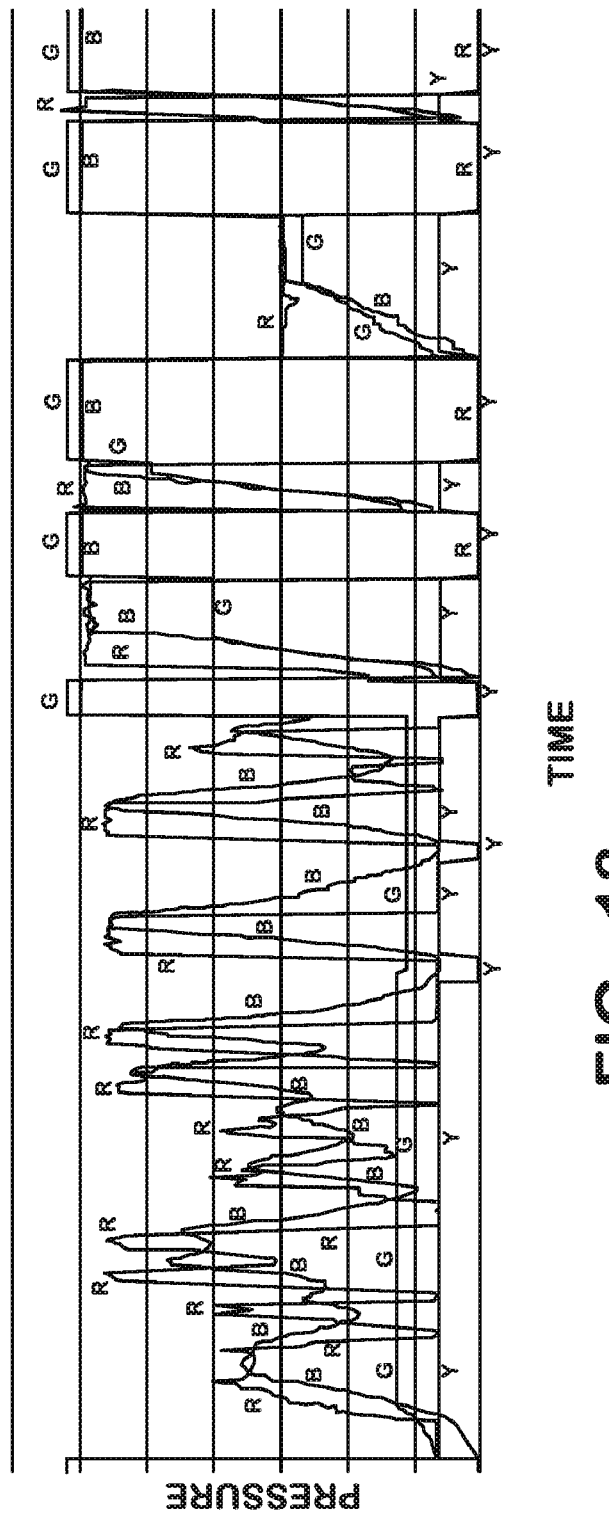
FIG. 13.- GRAPHICAL REPRESENTATION OF ePTO CONTROL SYSTEM OPERATING IN CONJUNCTION WITH A COMBINED OPEN AND CLOSED TYPE HYDRAULIC SYSTEM

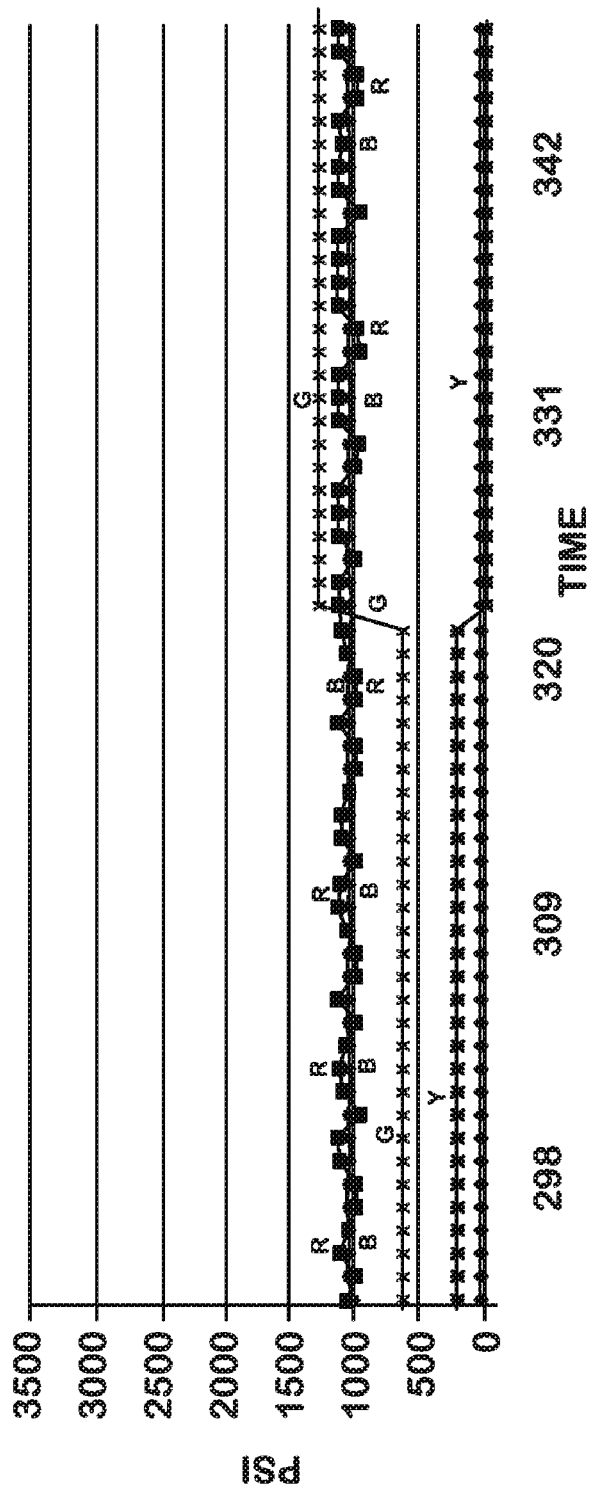

HYBRID ELECTRIC VEHICLE TRACTION MOTOR DRIVEN POWER TAKE-OFF CONTROL SYSTEM

FIELD OF THE INVENTION

This invention relates to a vehicle having a hybrid electric powertrain which is built as a partially complete vehicle and to which a second body manufacturer adds a body and equipment that is designed for certain specific tasks. Vehicles such as this often are provided by the initial manufacturer with a cab, a chassis having an engine, a transmission, and running gear, and certain provisions which are utilized by the second body manufacturer. One device that is often provided is a Power Take-Off (PTO) which provides mechanical power for the equipment installed by the second body manufacturer. When the vehicle has a hybrid electric powertrain, the electric traction motor which is a part of that hybrid electric powertrain may be advantageously used to provide power to the PTO when the vehicle is parked with or without the engine running. Often, the PTO provides power to a hydraulic pump, which provides hydraulic pressure to operate such devices as lifts and outriggers.

BACKGROUND

The intent of a hybrid system utilizing an electric traction motor driven power take off system, known as an "ePTO," connected to a hydraulic pump is to activate the electric traction motor to create hydraulic flow and pressure through the hydraulic pump's axial motion only during times when it is necessary to operate the installed hydraulic body equipment. All other times when the operation of the installed hydraulic body equipment is not desired, the hybrid electric traction motor driven PTO can be deactivated, minimizing the hybrid system's overall power consumption during the ePTO mode of operation. Activation of the hybrid electric traction motor driven PTO is performed by use of activation signals. These activation signals are generally electrical signals produced by mechanical sourcing devices or switches integrated in conjunction with the hydraulic valves, levers, or other mechanical electrical switch devices that are part of the controls of the equipment installed by the second body manufacturer. These input signal generation devices provide activation signals to physical, logical, or datalink inputs for the purpose of initiating the hybrid electric traction motor driven PTO for the purpose of driving the hydraulic pump in order to operate the installed body equipment.

A problem that often exists with second body manufacturer installed equipment is the diverse types of mechanical devices, primarily hydraulic valves and levers, that generate activation signals upon their operation or manipulation. Because of the complex compound mechanical characteristics of these valves and levers, as well as their remote locations from the ePTO and its control system, their diverse dielectric requirements and characteristics, and the fact that they are often numerous, it can be physically or economically prohibitive to provide appropriate activation signals from each valve or lever under all operational conditions in which activation of the hybrid electric traction motor driven ePTO is required. Furthermore, "debugging" a system of this type can be time consuming and problematic.

SUMMARY OF THE INVENTION

In order to address the problems described previously, it is beneficial to reduce the number and complexity of the input signal devices associated with the second body manufacturer installed hydraulic equipment, and employ control strategy software residing within the control system of the ePTO which monitors hydraulic main system pressure deltas and simultaneous trend vectors. The control system of the ePTO may reside within the vehicle Electronic System Controller's (ESC) software and hardware input output architecture. The pressure deltas and trend vectors, calculated from pressure signals provided by one or more analog hydraulic pressure transducers, can be employed by the control system to determine the need to generate a continuation of operation signal for the continuation of the hybrid electric traction motor driven PTO's operation. Note that the initiation of the hybrid electric traction motor must come from a secondary equipment manufacturer signal request device connected directly to the ESC or one of the vehicle Remote Power Modules (RPM). The analog hydraulic pressure transducer may be connected to the second body manufacturer hydraulic equipment high pressure hydraulic hose leading from the ePTO driven hydraulic pump to the first hydraulic circuit supplying hydraulic potential to the second body manufacturer installed hydraulic equipment in the case of open center type hydraulic systems. Alternately, the analog hydraulic pressure transducer may be connected to a valve body that exposes the transducer to the hydraulic potential within the second body manufacturer high pressure hydraulic hose leading from the ePTO driven hydraulic pump to the first hydraulic circuit supplying hydraulic potential to the second body manufacturer installed hydraulic equipment by shuttling a valve via return line pressure within the low pressure hydraulic hose leading from the first hydraulic circuit to the reservoir via a transducer sense pressure line in the case of closed center type hydraulic systems. This return line pressure is generated as a consequence of every actuation of the hydraulic equipment. Furthermore, if the second body manufacturer hydraulic equipment is provided with both open center type and closed center type hydraulic systems, an analog hydraulic pressure transducer may be connected to the second body manufacturer hydraulic equipment high pressure hydraulic hose leading from the ePTO driven hydraulic pump to the first hydraulic circuit supplying hydraulic potential to the second body manufacturer installed open center type hydraulic systems, and also may be connected to the high pressure hydraulic hose leading from the ePTO driven hydraulic pump to the first hydraulic circuit and to the low pressure hydraulic hose leading from the first hydraulic circuit to the hydraulic reservoir via a transducer sense pressure line in the closed center type hydraulic systems as will become apparent from the drawings that follow. In this design, one analog hydraulic pressure transducer is capable of sensing hydraulic pressure deltas and trend vectors indicative of normal equipment operation in both open and closed center portions of a combined open and closed center hydraulic type hydraulic system.

The purpose of the analog hydraulic pressure transducer is to determine if there is any activity in the hydraulics system indicative of normal equipment operation and to report it to the ePTO control system through an analog pressure signal. Initialization of the system is by operator command. However, as long as the ePTO control system continues to detect activity in the hydraulics system indicative of normal equipment operation via the analog hydraulic pressure transducer, the hybrid electric traction motor continues in its active state, even though there may no longer be an active activation signal coming from any of the remaining mechanical input devices.

Once there is no longer any detection by the ePTO control system via the analog hydraulic pressure transducer of any activity in the second body manufacturer hydraulic system indicative of normal equipment operation, and there is no active activation signal from any of the mechanical input devices, a first programmable timer will be allowed to expire, resulting in the deactivation of the hybrid electric traction motor by the ePTO control system. The control strategy software residing within the ePTO control system may also include an internal diagnostic self test or various programmable parameters allowing it to be customized for various applications, or both. Once the programmable parameters of the control strategy software residing within the ePTO control system have been set initially, the control strategy software will continually "learn" in its operating environment. The result of the "learning" capability of the control strategy software residing within the ePTO control system is that the system may require no further calibration or manipulation, even in the presence of changes in hydraulic oil types or other thermodynamic effects impacting oil viscosity. Additionally, the control strategy software may be preprogrammed to employ certain "insights" into the operation of commonly installed second body manufacturer hydraulic equipment. Specifically, if the second body manufacturer hydraulic system is part of a utility lift or bucket truck, the control strategy software may be preprogrammed to look for activity in the second body manufacturer hydraulic system of certain durations at certain intervals, whereas if the second body manufacturer hydraulic system is part of a garbage loader and compactor, the control strategy software may be preprogrammed to look for activity in the second body manufacturer hydraulic system of considerably different durations and intervals.

Addressing more specifically the control strategy software residing within the control system of the ePTO that monitors hydraulic main system pressure deltas and simultaneous trend vectors, the control strategy software residing within the control system has several variables based on the values of the analog pressure signal provided by the analog hydraulic pressure transducer. The first variable is the instantaneous system pressure, which may be represented graphically as a "red line." The second variable is the mean system pressure, which is a twenty-five point rolling average of the instantaneous system pressure, and may be represented graphically as a "blue line." The number of points in the rolling average that is the mean system pressure represented by the blue line may be programmable, so that the number of points may be more or less than twenty-five. Twenty-five points is approximately five seconds of samples of the instantaneous system pressure. The blue line is possessed of a 90 pounds per square inch (psi) deadband, extending approximately 45 psi above and approximately 45 psi below the blue line. The third variable is a trend or baseline value, which may be represented graphically as a "green line." The third variable which may be represented as the green line in turn represents the system backpressure when the hydraulic pump is running and there is no activity in the hydraulic system. Specifically, the green line represents what the control strategy software residing within the control system of the ePTO knows to be the lowest back pressure value that it has received from the analog hydraulic pressure transducer in a particular "operating session." The green line may be allowed to rise or fall according to a method that will be explained in further detail.

Upon initialization of the control strategy software residing within the control system of the ePTO, the green line is set at a programmable arbitrary value of approximately 3100 psi and the blue line is set at a programmable arbitrary value of approximately 3000 psi. The continuation of operation signal produced by the control strategy software residing within the control system of the ePTO is at zero, such that it is not commanding the electric traction motor driven PTO to run. Note that if the system is a closed center hydraulic type system, the hydraulic pressure accumulator has a hydraulic pressure accumulator pressure switch which detects the state of charge of the hydraulic pressure accumulator. When the hydraulic pressure accumulator state of charge declines below a discrete set point the hydraulic pressure accumulator pressure switch will send a request to the ESC to run the hybrid electric traction motor for the purpose of operating the hybrid electric traction motor driven PTO and hydraulic pump to recharge the hydraulic pressure accumulator. There is no operator action required to facilitate the regeneration the hydraulic pressure accumulator, as it is a separate entirely automated process and system. The operator commands the system to start, and the electric traction motor driven PTO runs for a period of time. Thereafter, operation of the system is based on the control strategy software residing within the control system of the ePTO, with operator commands regarding activation of the electric traction motor driven PTO being ignored (unless the system is re-initialized.) The operator begins to manipulate the hydraulic controls, and the analog hydraulic pressure transducer begins to report analog pressure signals. When the red line first rises above approximately 150 psi, the blue line is set to approximately zero, and begins to rise according to its calculated average of the red line. The green line is also set to a value that is approximately 300 psi above the blue line. As the blue line begins to rise, the green line also rises accordingly, although the distance between it and the blue line begins to decrease according to a proportional algorithm. The green line is allowed to rise to follow the blue line at a diminishing ratio for a period of approximately four and a half seconds (approximately half a second less than the length of the 25 point sample of the instantaneous system pressure that is the red line). At a value approximately midway between zero psi and the maximum system pressure, for example 1600 psi, the diminishing ratio is such that the green line is the same value as the blue line. Above the value approximately midway between zero psi and the maximum system pressure, for example 1600 psi, the ratio inverts, so that the blue line is above the green line at an increasing ratio.

At the four and a half second mark, the green line is "frozen" at whatever value that it has attained based on its variably proportional relationship to the blue line, but only if the red line is above the green line. If the four and a half second timer expires and the red line is below the green line, the green line will continue to follow the blue line according to the variably proportional algorithm. In this situation, once the red line crosses the green line, the green line is then "frozen" at whatever value that it has attained based on its variably proportional relationship to the blue line. The blue line continues to track the red line based on its 25 point average of the red line values. Under normal operation, the green line remains "frozen" at that value for a period of time, which period of time may be programmable, and then is allowed to take a single step toward the blue line, but only in a downward direction, before freezing again for another time interval. The green line is only allowed to take a downward step if the red line is below the blue line and if the blue line is below the green line by a certain ratio value, which ratio value may also be programmable. The size of the step that the green line is allowed to take downward is proportional to the instantaneous distance between the red line and the blue line. The result of these relationships is that the green line, which represents the system backpressure when the hydraulic pump is running, or at least what the control strategy software residing within the control system of the ePTO believes the system backpressure to be, approaches but does not entirely converge with the rest state of the average of the instantaneous pressure, which is the blue line, without descending too far based on momentary dropouts of the instantaneous pressure and thereby causing the control strategy software residing within the control system of the ePTO to erroneously recognize baseline system backpressure as ongoing demand. The green line is then in turn used as a semi-fixed point of reference in deciding if the second body manufacturer hydraulic equipment is being used or not.

The continuation of operation signal produced by the control strategy software residing within the control system of the ePTO depends upon the relationship between the red, blue, and green lines. If the red line is below 150 psi, there is no activity in the hydraulic system, and the control strategy software residing within the control system of the ePTO does not command continuation of operation of the hybrid traction motor driven PTO. If the red line is above either the deadband of the blue line or it is above the green line, then there is activity in the hydraulic system, and the control strategy software residing within the control system of the ePTO commands continuation of operation of the hybrid traction motor driven PTO. If the blue line is above the green line, then there is activity in the hydraulic system, and the control strategy software residing within the control system of the ePTO commands continuation of operation of the hybrid traction motor driven PTO. Therefore, determination of the need for the hybrid traction motor driven PTO to continue is based on the red line being outside the deadband of the blue line or above the green line, or the blue line being above the green line. If none of these conditions is true, the control strategy software residing within the control system of the ePTO stops sending the continuation of operation signal, thereby stopping the hybrid traction motor driven PTO, and starts the aforementioned programmable timer. If activity is detected before the timer expires, the control strategy software residing within the control system of the ePTO restarts the hybrid traction motor driven PTO and resets the programmable timer. Once the programmable timer expires, the control strategy software residing within the control system of the ePTO resets the green line to its programmable arbitrary value of approximately 3100 psi and the blue line to its programmable arbitrary value of approximately 3000 psi. Thereafter, if the red line rises above 150 psi, the control strategy software residing within the control system of the ePTO reinitializes.

There is a further feature of the control strategy software residing within the control system of the ePTO which is especially advantageous in combined open and closed center hydraulic systems, or in any hydraulic system where the baseline hydraulic backpressure may suddenly change, such as through the coupling of tools or actuators. As an example, a system may have open center hydraulic circuits and closed center hydraulic circuits, which are separated by a selector valve. Each set of circuits may communicate with the hydraulic pressure transducer via a special transducer sense pressure valve, as the closed center hydraulic circuits may require the use of a special transducer sense pressure line to prevent the analog hydraulic pressure transducer from reading the instantaneous hydraulic pressure as constantly full system pressure, or that of the hydraulic pressure accumulator, as will become apparent from the drawings. In this situation, if the selector valve is changed from one set of circuits to another set of circuits, or as noted if tools or actuators are suddenly coupled to the system, the baseline hydraulic backpressure may suddenly increase.

To cope with this possibility, the control strategy software residing within the control system of the ePTO watches for the condition where the red line and the blue line converge above the green line, and remain converged above the green line for a second programmable period of time, for example twenty or thirty seconds. If the red line never leaves the deadband surrounding the blue line for the duration of the second programmable period of time, and if the blue line is above a value approximately midway between zero psi and the maximum system pressure, for example 1600 psi, which may also be the point where the ratio between the green line and the blue line would become unity upon system initialization, the green line is allowed to move above the blue line in the same way that it would be allowed to do when the system initializes. This results in the control strategy software residing within the control system of the ePTO determining that the convergent red and blue lines represent a new baseline hydraulic backpressure. In the rare circumstance where this is incorrect, and the convergent red and blue lines somehow represented a very steady demand, which would be highly unusual, no harm is done, as the green line simply converges downward once the pressure drops off again, according to normal operation. If the rarity of such very steady demand remains long enough for the first programmable timer to expire, then the traction motor would simply turn off and further demand would cause the system to restart and reset.

Finally, the control strategy software residing within the control system of the ePTO may be provided with a programmable debounce feature, such that momentary spikes of the red line above 150 psi are ignored for the purposes of system initialization. This prevents impact pressures which are communicated through the hydraulic system to the analog hydraulic pressure transducer from causing unnecessary initializations of the control strategy software residing within the control system of the ePTO and the resulting unnecessary running of the hybrid electric traction motor driven PTO. It is emphasized that the same control strategy software residing within the control system of the ePTO works with open center, closed center, and combined open and closed center hydraulic systems, though the output of the analog hydraulic pressure transducer tends to be square in form on closed center hydraulic systems, and more analog in form on open center hydraulic systems. This provides for commonality of systems and reduced product variation costs.

Overall, the control strategy software residing within the ePTO control system, and the signals produced by the analog hydraulic pressure transducer, reduce the need for and complexity of activation signals produced by mechanical sourcing devices or switches integrated in conjunction with hydraulic valves, levers or other mechanical electrical switch devices installed by the second body manufacturer. This delivers increased levels operational efficiency and safety for a hybrid system utilizing an ePTO, as well as increased effectiveness in the area of integration between initial vehicle manufacturer and second body manufacturer systems.

As described above, the Hybrid Electric Vehicle Traction Motor Driven Power Take-Off Control System and a vehicle made with this system provide a number of advantages, some of which have been described above and others of which are inherent in the invention. Also, modifications may be proposed to the Hybrid Electric Vehicle Traction Motor Driven Power Take-Off Control System or a vehicle made with this system without departing from the teachings herein.

BRIEF DESCRIPTION OF THE DRAWINGS

FIG. 1—An embodiment of the present invention, a hybrid electric utility vehicle having hydraulic equipment with the Hybrid Electric Vehicle Traction Motor Driven Power Take-Off Control System, side view.

FIG. 2—An embodiment of the present invention, a representation of an engine and transmission for use with a hybrid electric utility vehicle having an ePTO, side view.

FIG. 3—An embodiment of the present invention, a hydraulic system utilizing the Hybrid Electric Vehicle Traction Motor Driven Power Take-Off Control System of the open center type.

FIG. 4—An embodiment of the present invention, a hydraulic system utilizing the Hybrid Electric Vehicle Traction Motor Driven Power Take-Off Control System of the closed center type.

FIG. 5—An embodiment of the present invention, a hydraulic system utilizing the Hybrid Electric Vehicle Traction Motor Driven Power Take-Off Control System of the combined open and closed center type.

FIG. 6—An embodiment of the present invention, an analog hydraulic pressure transducer used in the Hybrid Electric Vehicle Traction Motor Driven Power Take-Off Control System.

FIG. 7—An embodiment of the present invention, an analog hydraulic pressure transducer, an ePTO control system residing within an Electronic System Controller, and the associated vehicle network.

FIG. 8—graphical representation of system initialization.

FIG. 9—graphical representation of downward convergence during activity.

FIG. 10—graphical representation of downward convergence during rest.

FIG. 11—graphical representation of a closed center hydraulic system.

FIG. 12—graphical representation of an open center hydraulic system.

FIG. 13—graphical representation of a combined open center and closed center hydraulic system.

FIG. 14—graphical representation of establishment of a new baseline.

DETAILED DESCRIPTION OF THE INVENTION

FIG. 1 shows a vehicle 100 having a body 101, a cab 102, a chassis 103, and running gear 107. The body 101 is provided with body equipment 104 which is operated by means of hydraulic actuators 105. Mechanical input devices 106 control the hydraulic actuators 105.

FIG. 2 shows a hybrid electric powertrain 200 having an engine 201 and a transmission 202. The transmission 202 is provided with a hybrid electric traction motor 203. The transmission 202 is further provided with a power take-off 204, which power take-off 204 may be selectively driven by the hybrid electric traction motor 203, the engine 201, or both. The power take-off 204 is connected to and drives a hydraulic pump 304.

FIG. 3 shows an embodiment of the present invention, an open center type hydraulic system 300 having provisions for use with the Hybrid Electric Vehicle Traction Motor Driven Power Take-Off Control System. The open center type hydraulic system 300 is provided with a hydraulic pump 304 and several hydraulic cylinders 307, which are controlled by open center hydraulic spool valves 309. A high pressure hydraulic hose 305 leads from the hydraulic pump 304 to the open center hydraulic spool valves 309 and a low pressure hydraulic hose 308 returns from the open center hydraulic spool valves 309 to a hydraulic reservoir 319, thereby completing at least one hydraulic circuit 303. Hydraulic oil 317 is stored in the hydraulic reservoir 319, which has a hydraulic reservoir vent 320 exposing the hydraulic oil 317 to atmospheric pressure 321. A hydraulic oil supply hose 318 supplies hydraulic oil 317 to the hydraulic pump 304. As a provision for implementation of the invention, an analog hydraulic pressure transducer 401 is connected to the high pressure hydraulic hose 305 at a point between the hydraulic pump 304 and the first open center hydraulic spool valve 309. A hydraulic pressure analog signal wire 322 leads from the analog hydraulic pressure transducer 401 to the ePTO control system 400 (not shown). The ePTO control system 400 utilizes the signals from the analog hydraulic pressure transducer 401 to determine if there is any activity in the open center type hydraulics system 300 indicative of normal equipment operation via an analysis of pressure deltas and simultaneous trend vectors.

FIG. 4 shows an embodiment of the present invention, a closed center type hydraulic system 301 having provisions for use with the Hybrid Electric Vehicle Traction Motor Driven Power Take-Off Control System. The closed center type hydraulic system 301 is provided with a hydraulic pump 304 having a hydraulic pump stroking solenoid 316, and several hydraulic cylinders 307, which are controlled by closed center hydraulic spool valves 310. A high pressure hydraulic hose 305 leads from the hydraulic pump 304 to the closed center hydraulic spool valves 310 and a low pressure hydraulic hose 308 returns from the closed center hydraulic spool valves 310 to a hydraulic reservoir 319, thereby completing at least one hydraulic circuit 303. Hydraulic oil 317 is stored in the hydraulic reservoir 319, which has a hydraulic reservoir vent 320 exposing the hydraulic oil 317 to atmospheric pressure 321. A hydraulic oil supply hose 318 supplies hydraulic oil 317 to the hydraulic pump 304. A hydraulic pressure accumulator 311 is connected to the high pressure hose 305 and serves to supply transient demands for hydraulic potential, as well as to reduce hydraulic shock within the hydraulic circuit 303. Fluid communication between the hydraulic pressure accumulator 311 and the high pressure hydraulic hose 305 may be selectively controlled by an accumulator blocking valve 315 controlled by an accumulator blocking valve solenoid 314 according to signals generated by an accumulator pressure switch 313. As a provision for implementation of the invention, an analog hydraulic pressure transducer 401 is connected to the high pressure hydraulic hose 305 at a point between the hydraulic pump 304 and the first closed center hydraulic spool valve 310, and is connected to a transducer sense pressure valve 323, which transducer sense pressure valve 323 is in turn connected to the low pressure hydraulic hose 308 at a point between the first closed center hydraulic spool valve 310 and the hydraulic reservoir 319 via a transducer sense pressure line 306. A hydraulic pressure analog signal wire 322 leads from the analog hydraulic pressure transducer 401 to the ePTO control system 400 (not shown). The ePTO control system 400 utilizes the signals from the analog hydraulic pressure transducer 401 to determine if there is any activity in the closed center type hydraulics system 301 indicative of normal equipment operation via an analysis of pressure deltas and simultaneous trend vectors.

FIG. 5 shows an embodiment of the present invention, a combined open and closed center type hydraulic system 302 having provisions for use with the Hybrid Electric Vehicle Traction Motor Driven Power Take-Off Control System. The combined open and closed center type hydraulic system 302 is provided with a hydraulic pump 304 having a hydraulic pump stroking solenoid 316, and several hydraulic cylinders 307, which are controlled by open center hydraulic spool valves 309 or closed center hydraulic spool valves 310. A high pressure hydraulic hose 305 leads from the hydraulic pump 304 to a hydraulic system selector valve 312. Further high pressure hydraulic hoses 305 lead from the hydraulic system selector valve 312 to the open center hydraulic spool valves 309 and closed center hydraulic spool valves 310. Low pressure hydraulic hoses 308 return from the open center hydraulic spool valves 309 and closed center hydraulic spool valves 310 to a hydraulic reservoir 319, thereby completing at least one hydraulic circuit 303. Hydraulic oil 317 is stored in the hydraulic reservoir 319, which has a hydraulic reservoir vent 320 exposing the hydraulic oil 317 to atmospheric pressure 321. A hydraulic oil supply hose 318 supplies hydraulic oil 317 to the hydraulic pump 304. A hydraulic pressure accumulator 311 is connected to the high pressure hose 305 prior to the hydraulic system selector valve 312, and serves to supply transient demands for hydraulic potential, as well as to reduce hydraulic shock within the hydraulic circuits 303. Fluid communication between the hydraulic pressure accumulator 311 and the high pressure hydraulic hose 305 may be selectively controlled by an accumulator blocking valve 315 controlled by an accumulator blocking valve solenoid 314 according to signals generated by an accumulator pressure switch 313. As a provision for implementation of the invention, an analog hydraulic pressure transducer 401 may be connected to the high pressure hydraulic hose 305 via a transducer sense pressure valve 323 having a port that provides independent fluid communication between the analog hydraulic pressure transducer 401 and the high pressure hydraulic hose 305 at a point between the hydraulic selector valve 312 and the first open center hydraulic spool valve 309. The same analog hydraulic pressure transducer 401 may be connected to the high pressure hydraulic hose 305 via the same transducer sense pressure valve 323 also having a port that provided dependent fluid communication between the analog hydraulic pressure transducer 401 and the high pressure hydraulic hose 305 at a point between the hydraulic selector valve 312 and the first closed center hydraulic spool valve 310, and be connected to the low pressure hydraulic hose 308 at a point between the first closed center hydraulic spool valve 310 and the hydraulic reservoir 319 via a transducer sense pressure line 306. Fluid communication between the analog hydraulic pressure transducer 401 and the high pressure hydraulic hose 305 between the hydraulic selector valve 312 and the first closed center hydraulic spool valve 310 is dependent upon flow of hydraulic fluid through the transducer sense pressure line 306. Hydraulic pressure analog signal wires 322 lead from the analog hydraulic pressure transducers 401 to the ePTO control system 400 (not shown). The ePTO control system 400 (not shown) utilizes the signals from the analog hydraulic pressure transducer 401 to determine if there is any activity in the combined open and closed center type hydraulics system 302 indicative of normal equipment operation via an analysis of pressure deltas and simultaneous trend vectors.

FIG. 6 is a detail of the analog hydraulic pressure transducer 401 as implemented in a combined open and closed center type hydraulic system 302. The analog hydraulic pressure transducer 401 is connected to the transducer sense pressure valve 323, which transducer sense pressure valve 323 is in turn connected to the high pressure hydraulic hose 305a at a point between the hydraulic system selector valve 312 (not shown) and the first open center hydraulic spool valve 309 (not shown). The transducer sense pressure valve 323 is also connected to the high pressure hydraulic hose 305b at a point between the hydraulic system selector valve 312 (not shown) and the first closed center hydraulic spool valve 310 (not shown). The transducer sense pressure valve 323 is also connected to the low pressure hydraulic hose 308 at a point between the first closed center hydraulic spool valve 310 (not shown) and the hydraulic reservoir 319 (not shown) via a transducer sense pressure line 306. A hydraulic pressure analog signal wire 322 leads from the analog hydraulic pressure transducer 401 to the ePTO control system 400 (not shown). Fluid communication between the analog hydraulic pressure transducer 401 and the high pressure hydraulic hose 305b between the hydraulic selector valve 312 (not shown) and the first closed center hydraulic spool valve 310 (not shown) is dependent upon flow of hydraulic fluid through the transducer sense pressure line 306.

FIG. 7 shows an ePTO control system 400 residing on an electronic system controller 403 connected to a vehicle network 416. The ePTO control system 400 receives hydraulic pressure analog signals from the analog hydraulic pressure transducer 401 via the hydraulic pressure analog signal wire 322. The ePTO control system 400 communicates with a hybrid control module 408, a transmission control module 409, and a PTO gauge cluster 407 by means of a vehicle manufacturer public J1939 data bus. The ePTO control system 400 may also communicate with other vehicle components, such as the center in cab dash panel 404, by means of a vehicle manufacturer private J1708/1587 data bus 405. A transmission shift console 411 also communicates with the transmission control module 409 via a transmission manufacturer private data bus 410. The ePTO control system 400 further communicates with a remote power module input output for base ePTO hybrid 413 via a vehicle manufacturer private J1939 data bus 412. Based on these communications, the ePTO control system 400 controls the power take-off 204 by means of a manifold solenoid valve assembly 414 connected to the primary vehicle air pressure supply 415. Finally, a programmable timer 402 is represented figuratively in FIG. 7 by a clock, while it is understood that the programmable time 402 may or may not be integrated into the ePTO control system 400.

FIG. 8 shows a graphical representation of ePTO control system initialization. The instantaneous system pressure is represented by a line labeled "R" for red. The mean system pressure, which is the twenty-five point rolling average of the instantaneous system pressure, is labeled "B" for blue. The trend or baseline value, which is determined by the control strategy software residing within the control system of the ePTO, and which represents the system backpressure when the hydraulic pump is running, is labeled "G" for green. The continuation of operation signal produced by the control strategy software is overlaid as a line labeled "Y" for yellow, and indicating an output of 500 as a command to activate the hybrid traction motor driven PTO or an output of zero as a command to deactivate the hybrid traction motor driven PTO. The representation of an output of "500 psi" as a command to continue operation of the hybrid traction motor driven PTO is arbitrary for the sake of graphical representation, as the actual continuation of operation signal is merely an on (1) or off (0) signal. The control strategy software residing within the control system of the ePTO is represented as going through an initiation cycle, as described previously.

FIG. 9 shows a graphical representation of the ePTO control system. The instantaneous system pressure is again represented by a line labeled "R" for red, the mean system pressure is again labeled "B" for blue, and the trend or baseline value is again labeled "G" for green. The continuation of operation signal produced by the control strategy software is again overlaid as a line labeled "Y" for yellow, with the arbitrary selection of output of 500 psi as representative of a command to continue operation of the hybrid traction motor driven PTO as in FIG. 8. The graphical representation of the ePTO control system shown in FIG. 9 shows downward convergence of the trend or baseline value during a period of hydraulic system activity.

FIG. 10 shows a graphical representation of the ePTO control system. The instantaneous system pressure is again represented by a line labeled "R" for red, the mean system pressure is again labeled "B" for blue, and the trend or baseline value is again labeled "G" for green. The continuation of operation signal produced by the control strategy software is again overlaid as a line labeled "Y" for yellow, with the arbitrary selection of output of 500 psi as representative of a command to continue operation of the hybrid traction motor driven PTO as in FIG. 8. The graphical representation of the ePTO control system shown in FIG. 10 shows downward convergence of the trend or baseline value during a period of hydraulic system inactivity.

FIG. 11 shows a graphical representation of the ePTO control system with lines labeled in the same convention as in FIGS. 8 through 10. The graphical representation shown in FIG. 11 is of the ePTO control system engaged in controlling a closed center type hydraulic system.

FIG. 12 shows a graphical representation of the ePTO control system with lines labeled in the same convention as before. The graphical representation shown in FIG. 12 is of the ePTO control system engaged in controlling an open center type hydraulic system.

FIG. 13 shows a graphical representation of the ePTO control system with lines labeled in the same convention as before. The graphical representation shown in FIG. 13 is of the ePTO control system engaged in controlling a combined open and closed center type hydraulic system.

FIG. 14 shows a graphical representation of the ePTO control system with lines labeled in the same convention as before. The graphical representation shows the trend or baseline resetting upwards based upon the red line and the blue line converging above the green line, and remaining converged above the green line for the second programmable period of time, as described previously.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to a Hybrid Electric Vehicle Traction Motor Driven Power Take-Off Control System and a vehicle made with this system may also be inherent in the invention, without having been described above.

I claim:

1. A vehicle for operation on the ground, comprising:
   a chassis, said chassis having a hybrid electric powertrain, said hybrid electric powertrain having a hybrid electric traction motor;
   a power take off selectively driven by said hybrid electric traction motor;
   an electronic controller having software for controlling the operation of said selectively driven power take off;
   a hydraulic pump driven by said selectively driven power take off, a hydraulic system, said hydraulic pump providing hydraulic potential to said hydraulic system, said hydraulic system having at least one high pressure hydraulic hose and at least one hydraulic circuit, said at least one high pressure hydraulic hose conducting said hydraulic potential from said hydraulic pump to said at least one hydraulic circuit; and
   at least one analog hydraulic pressure transducer being in fluid communication with said at least one high pressure hydraulic hose and providing an analog pressure signal to said software, said software calculating an instantaneous system pressure variable, a mean system pressure variable, and a trend variable from said analog pressure signal provided by said at least one analog hydraulic pressure transducer, said software using said instantaneous system pressure variable, mean system pressure variable, and trend variable to determine the operation of said selectively driven power take off.

2. The vehicle for operation on the ground of claim 1, wherein:
   said mean system pressure variable being a rolling average of said instantaneous system pressure variable.

3. The vehicle for operation on the ground of claim 2, wherein:
   said mean system pressure variable being a 25 point rolling average of said instantaneous system pressure variable.

4. The vehicle for operation on the ground of claim 2, wherein:
   said rolling average having a programmable number of points.

5. The vehicle for operation on the ground of claim 2, wherein:
   said trend variable being dependent upon and in a variably proportional mathematical relation with said mean system pressure variable for a first period of at least four and a half seconds immediately following said instantaneous system pressure variable first rising above about 150 psi following initialization of said hydraulic system, and said trend variable continuing in a frozen state for a second period of time thereafter.

6. The vehicle for operation on the ground of claim 5, wherein:
   said variably proportional mathematical relation being such that, during said first period of at least four and a half seconds, said trend variable has a value of approximately 300 psi greater than the value of said mean system pressure variable when said mean system pressure variable is about zero, and said trend variable is equal to said mean system pressure variable when said mean system pressure variable is a value approximately midway between zero psi and the maximum system pressure, and said trend variable is less than said mean system pressure when said mean system pressure variable is above said value approximately midway between zero psi and the maximum system pressure.

7. The vehicle for operation on the ground of claim 6, wherein:
   said trend variable continuing in said variably proportional mathematical relation with said mean system pressure variable beyond said first period of at least four and a half seconds if said instantaneous system pressure variable is below said trend variable, until such time that said instantaneous system pressure variable rises above said trend variable, upon which said trend variable continues in said frozen state for said second period of time thereafter.

8. The vehicle for operation on the ground of claim 7, wherein:
   said second period of time being programmable in length.

9. The vehicle for operation on the ground of claim 7, wherein:

said trend variable being reduced by a downward step amount at the end of said second period of time only if said instantaneous system pressure variable is less than said mean system pressure variable and if said mean system pressure variable is less than said trend variable by at least a first proportional ratio amount that is proportional to the difference between said trend variable and said mean system pressure variable divided by said mean system pressure variable.

10. The vehicle for operation on the ground of claim 9, wherein:
said proportionality of said first proportional ratio amount being programmable in magnitude.

11. The vehicle for operation on the ground of claim 9, wherein:
said downward step amount being proportional to the instantaneous difference between said instantaneous system pressure variable and said mean system pressure variable.

12. The vehicle for operation on the ground of claim 9, wherein:
said software selectively producing a continuation of operation signal for controlling the continued operation of said selectively driven power take off, said software selectively producing said continuation of operation signal only if:
said instantaneous system pressure variable is greater than about 150; and
said instantaneous system pressure variable is greater than said mean system pressure variable or said instantaneous system pressure variable is greater than said trend variable or said mean system pressure variable is greater than said trend variable.

13. The vehicle for operation on the ground of claim 12, wherein:
said software being further provided with a programmable timer, said programmable timer beginning to expire at cessation of said continuation of operation signal, said programmable timer resetting at resumption of said continuation of operation signal, and said programmable timer operating to reset said mean system pressure variable and said trend variable and to cause said software to require re-initialization of said hydraulic system.

14. The vehicle for operation on the ground of claim 13, wherein:
said hydraulic system further comprises an open center hydraulic system.

15. The vehicle for operation on the ground of claim 13, wherein:
said hydraulic system further comprises a closed center hydraulic system;
said closed center hydraulic system being provided with a hydraulic reservoir and at least one low pressure hydraulic hose, said at least one low pressure hydraulic hose conducting hydraulic fluid from said at least one hydraulic circuit to said hydraulic reservoir;
a transducer sense pressure valve being interposed between said at least one analog hydraulic pressure transducer and said at least one high pressure hydraulic hose, said transducer sense pressure valve being in fluid communication with a transducer sense pressure line, said transducer sense pressure line in turn being in fluid communication with said at least one low pressure hydraulic hose; and
said transducer sense pressure valve being operable to selectively control said fluid communication between said at least one analog hydraulic pressure transducer and said at least one high pressure hydraulic hose, said transducer sense pressure valve only allowing said fluid communication between said at least one analog hydraulic pressure transducer and said at least one high pressure hydraulic hose when said transducer sense pressure line provides hydraulic pressure indicative of said hydraulic fluid flowing through said at least one low pressure hydraulic hose.

16. The vehicle for operation on the ground of claim 13, wherein:
said hydraulic system further comprises a combined open and closed center hydraulic system;
said combined open and closed center hydraulic system being provided with a selector valve;
said at least one hydraulic circuit further comprising at least one closed center hydraulic circuit and at least one open center hydraulic circuit;
said at least one high pressure hydraulic hose further comprising a high pressure hydraulic hose leading from said hydraulic pump to said selector valve, a high pressure hydraulic hose leading from said selector valve to said at least one closed center hydraulic circuit, and a high pressure hydraulic hose leading from said selector valve to said at least one open center hydraulic circuit;
said combined open and closed center hydraulic system being provided with a hydraulic reservoir and at least two low pressure hydraulic hoses, one of said at least two low pressure hydraulic hoses conducting hydraulic fluid from said at least one closed center hydraulic circuit to said hydraulic reservoir, and another of said at least two low pressure hydraulic hoses conducting hydraulic fluid from said at least one open center hydraulic circuit to said hydraulic reservoir;
a transducer sense pressure valve being interposed between said at least one analog hydraulic pressure transducer and said high pressure hydraulic hose leading from said selector valve to said at least one open center hydraulic circuit and also between said at least one analog hydraulic pressure transducer and said high pressure hydraulic hose leading from said selector valve to said at least one closed center hydraulic circuit, said transducer sense pressure valve being in fluid communication with a transducer sense pressure line, said transducer sense pressure line in turn being in fluid communication with said one of said at least two low pressure hydraulic hoses conducting hydraulic fluid from said at least one closed center hydraulic circuit to said hydraulic reservoir; and
said transducer sense pressure valve being operable to allow fluid communication between said at least one analog hydraulic pressure transducer and said high pressure hydraulic hose leading from said selector valve to said at least one open center hydraulic circuit, and selectively control said fluid communication between said at least one analog hydraulic pressure transducer and said high pressure hydraulic hose leading from said selector valve to said at least one closed center hydraulic circuit, said transducer sense pressure valve only allowing said fluid communication between said at least one analog hydraulic pressure transducer and said high pressure hydraulic hose leading from said selector valve to said at least one closed center hydraulic circuit when said transducer sense pressure line provides hydraulic pressure indicative of said hydraulic fluid flowing through said one of said at least two low pressure hydraulic hoses conducting hydraulic fluid from said at least one closed center hydraulic circuit to said hydraulic reservoir.

17. The vehicle for operation on the ground of claim 16, wherein:
said mean system pressure variable having a deadband;
said trend variable being increased one time to a value greater than that of the mean system pressure variable only if:
said instantaneous system pressure variable and said mean system pressure variable converge upon a value greater than said trend variable and remain converged upon that value for a third programmable period of time, and the value of said instantaneous system pressure variable does not leave the confines of said deadband of said mean system pressure variable for the duration of said third programmable period of time; and
said mean system pressure variable has a value of greater than a value approximately midway between zero psi and the maximum system pressure.

18. The vehicle for operation on the ground of claim 13, wherein:
said software is provided with a programmable debounce feature.

19. A system for controlling a selectively driven power take off used in conjunction with a hydraulic pump and hydraulic system, comprising:
an electronic controller having software for controlling the operation of said selectively driven power take off;
at least one analog hydraulic pressure transducer being in fluid communication with at least one high pressure hydraulic hose of said hydraulic system and providing an analog pressure signal to said software, said software calculating an instantaneous system pressure variable, a mean system pressure variable, and a trend variable from said analog pressure signal provided by said at least one analog hydraulic pressure transducer, said software using said instantaneous system pressure variable, mean system pressure variable, and trend variable to determine the operation of said selectively driven power take off.

20. The system of claim 19, wherein:
said mean system pressure variable being a rolling average of said instantaneous system pressure variable.

21. The system of claim 20, wherein:
said trend variable being dependent upon and in a variably proportional mathematical relation with said mean system pressure variable for a first period of at least four and a half seconds immediately following said instantaneous system pressure variable first rising above about 150 psi following initialization of said hydraulic system, and said trend variable continuing in a frozen state for a second period of time thereafter.

22. The system of claim 21, wherein:
said variably proportional mathematical relation being such that, during said first period of at least four and a half seconds, said trend variable has a value of approximately 300 psi greater than the value of said mean system pressure variable when said mean system pressure variable is about zero, and said trend variable is equal to said mean system pressure variable when said mean system pressure variable is a value approximately midway between zero psi and the maximum system pressure, and said trend variable is less than said mean system pressure when said mean system pressure variable is above said value approximately midway between zero psi and the maximum system pressure.

23. The system of claim 22, wherein:
said trend variable continuing in said variably proportional mathematical relation with said mean system pressure variable beyond said first period of at least four and a half seconds if said instantaneous system pressure variable is below said trend variable, until such time that said instantaneous system pressure variable rises above said trend variable, upon which said trend variable continues in said frozen state for said second period of time thereafter.

24. The system of claim 23, wherein:
said trend variable being reduced by a downward step amount at the end of said second period of time only if said instantaneous system pressure variable is less than said mean system pressure variable and if said mean system pressure variable is less than said trend variable by at least a first proportional ratio amount that is proportional to the difference between said trend variable and said mean system pressure variable divided by said mean system pressure variable.

25. The system of claim 24, wherein:
said downward step amount being proportional to the instantaneous difference between said instantaneous system pressure variable and said mean system pressure variable.

26. The system of claim 24, wherein:
said software selectively producing a continuation of operation signal for controlling the continued operation of said selectively driven power take off, said software selectively producing said continuation of operation signal only if:
said instantaneous system pressure variable is greater than about 150; and
said instantaneous system pressure variable is greater than said mean system pressure variable or said instantaneous system pressure variable is greater than said trend variable or said mean system pressure variable is greater than said trend variable.

27. The system of claim 26, wherein:
said software being further provided with a programmable timer, said programmable timer beginning to expire at cessation of said continuation of operation signal, said programmable timer resetting at resumption of said continuation of operation signal, and said programmable timer operating to reset said mean system pressure variable and said trend variable and to cause said software to require re-initialization of said hydraulic system.

28. The system of claim 27, wherein:
said mean system pressure variable having a deadband;
said trend variable being increased one time to a value greater than that of the mean system pressure variable only if:
said instantaneous system pressure variable and said mean system pressure variable converge upon a value greater than said trend variable and remain converged upon that value for a third programmable period of time, and the value of said instantaneous system pressure variable does not leave the confines of said deadband of said mean system pressure variable for the duration of said third programmable period of time; and
said mean system pressure variable has a value of greater than a value approximately midway between zero psi and the maximum system pressure.

* * * * *